(12) United States Patent
Ullrich et al.

(10) Patent No.: US 8,564,535 B2
(45) Date of Patent: Oct. 22, 2013

(54) PHYSICAL MODEL BASED GESTURE RECOGNITION

(75) Inventors: Christopher J. Ullrich, Ventura, CA (US); Robert Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 388 days.

(21) Appl. No.: 12/898,032

(22) Filed: Oct. 5, 2010

(65) Prior Publication Data

US 2012/0081276 A1    Apr. 5, 2012

(51) Int. Cl.
  *G09G 5/00*    (2006.01)
  *G06F 3/01*    (2006.01)

(52) U.S. Cl.
  USPC .................... 345/156; 340/407.1; 715/702

(58) Field of Classification Search
  USPC ............... 345/156–184; 455/566; 340/407.1, 340/407.2; 715/701, 702, 863
  See application file for complete search history.

(56) References Cited

U.S. PATENT DOCUMENTS

| | | | |
|---|---|---|---|
| 6,252,583 B1 * | 6/2001 | Braun et al. .................. | 345/156 |
| 2001/0045941 A1 * | 11/2001 | Rosenberg et al. ........... | 345/161 |
| 2007/0002018 A1 * | 1/2007 | Mori ............................. | 345/158 |
| 2008/0303791 A1 * | 12/2008 | Rutledge et al. .............. | 345/157 |
| 2009/0085878 A1 * | 4/2009 | Heubel et al. ................. | 345/173 |
| 2010/0013653 A1 | 1/2010 | Birnbaum et al. | |
| 2010/0017759 A1 | 1/2010 | Birnbaum et al. | |

OTHER PUBLICATIONS

Hsin-Un Yao et al.; "An Experiment on Length Perception with a Virtual Rolling Stone"; Proc. Eurohaptics 2006; pp. 325-330.
http://en.wikipedia.org/w/index.php?title=Gesture_recognition &printable=yes; Jul. 23, 2010.

* cited by examiner

*Primary Examiner* — Stephen Sherman
(74) *Attorney, Agent, or Firm* — Miles & Stockbridge P.C.

(57) ABSTRACT

A gesture recognition system for recognizing gestures on a mobile device receives sensor data in response to a sensed gesture on the mobile device. The sensor data includes a force or impulse. The force or impulse is applied to the simulated physical object and the state of the simulated physical object is then observed. Input is provided to an application based at least on the observed state of the simulated physical object.

28 Claims, 5 Drawing Sheets

PHYSICAL MODEL BASED GESTURE RECOGNITION

FIELD

One embodiment is directed generally to a mobile device, and in particular to gesture recognition for a mobile device.

BACKGROUND INFORMATION

Gesture recognition for computer systems and other devices, in general, involves interpreting human gestures via mathematical algorithms. Gestures can originate from any bodily motion or state but commonly originate from the face or hand. Many approaches have been made using cameras and computer vision algorithms to interpret sign language. However, the identification and recognition of posture, gait, and human behaviors is also the subject of gesture recognition techniques.

One type of gesture recognition relies on a user holding or otherwise manipulating a controller or handheld/mobile device. These controllers act as an extension of the body so that when gestures are performed, some of their motion can be conveniently captured by software. Mouse gestures are one such example, where the motion of the mouse is correlated to a symbol being drawn by a person's hand. Another example is the Wii Remote, from Nintendo Corp., which can study changes in acceleration over time to represent gestures. These methods in general perform statistical analysis or signal processing of accelerometer data in order to recognize a gesture. However, one drawback is that the statistical analysis is typically specialized to a single type of motion, such as the motion when swinging a golf club when using a controller to interact with a video golf game.

SUMMARY

One embodiment is a gesture recognition system for recognizing gestures on a mobile device. The system receives sensor data in response to a sensed gesture on the mobile device. The sensor data includes a force or impulse. The force or impulse is applied to the simulated physical object and the state of the simulated physical object is then observed. Input is provided to an application based at least on the observed state of the simulated physical object.

DETAILED DESCRIPTION

One embodiment is a mobile device that incorporates gesture recognition in order to add functionality and provide a user interface to an application. The device includes a simulated physical system and a state machine with state transitions that are driven by observations of the physical system. Each state may correspond to a recognized gesture and haptic effects may be generated based on the recognized gestures.

Figure 1:
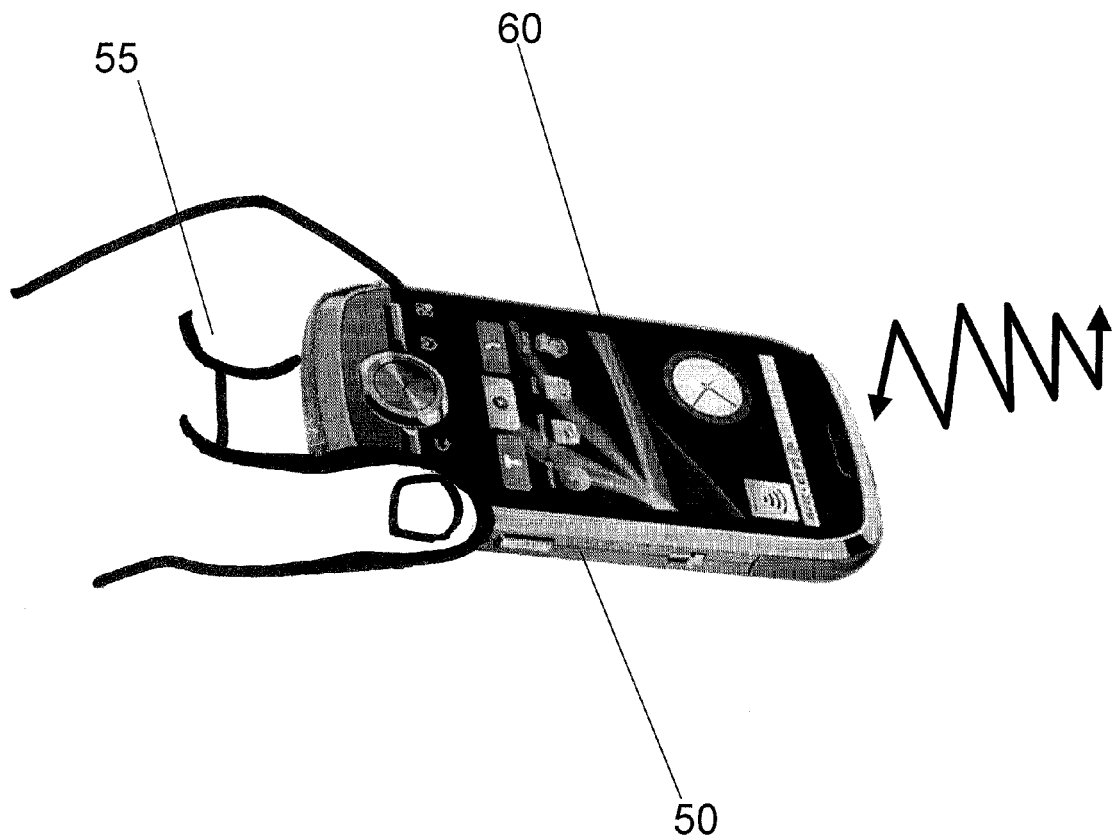
FIG. 1 is a perspective view of a mobile device in accordance with one embodiment of the invention.

FIG. 1 is a perspective view of a mobile device 50 in accordance with one embodiment of the invention. Mobile device 50, as shown, is a mobile telephone. However, device 50 in other embodiments can be any type of handheld device, including a portable digital assistant ("PDA"), portable media player, portable gaming device, etc. Device 50 includes a user interface ("UI") 60 that allows a user to interface with a software application executing on device 50. Device 50 further includes a gesture recognition system (not shown), disclosed in further detail below, that allows a user to interact with device 50 and UI 60 in a meaningful way such as by manipulating device 50 using a hand 55.

Figure 2:
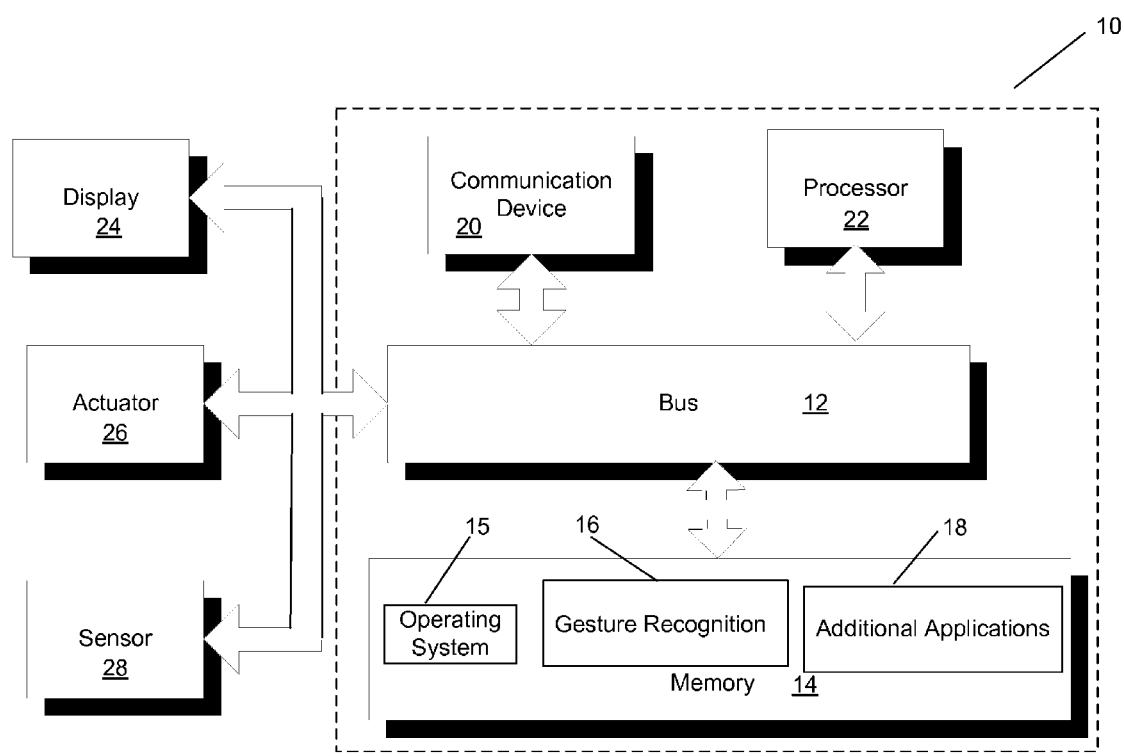
FIG. 2 is a block diagram of a gesture recognition system in accordance with one embodiment of the present invention.

FIG. 2 is a block diagram of a gesture recognition system 10 in accordance with one embodiment of the present invention. System 10 is part of mobile device 50 of FIG. 1, and it provides the gesture recognition functionality. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

In one embodiment, memory 14 stores software modules that provide functionality when executed by processor 22. The modules include an operating system 15 that provides operating system functionality for system 10, as well as the rest of device 50 in one embodiment. The modules further include a gesture recognition module 16 that recognizes user gestures, as disclosed in more detail below. System 10 will typically include one or more additional application modules 18 to include additional functionality, such as applications to generate haptic effects, and applications that interact with module 16 so that the recognized gestures can be used as input to those applications.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes one or more actuators 26. Processor 22 may transmit a haptic signal associated with a haptic effect to actuator 26, which in turn outputs haptic effects. Actuator 26 may be, for example, an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA").

System 10 further includes one or more sensors 28. Sensors 28 may include an accelerometer, a gyroscope, a Global Positioning System ("GPS") sensor, a touch-sensitive input device (e.g., touch screen, touchpad), a texture stylus, an imaging sensor, or some other type of sensor. Sensors 28 may be configured to detect changes in acceleration, inclination, inertia, or location. Sensors 28 may also include a location sensor, rotary velocity sensor, light sensor, pressure sensor, texture sensor, camera, microphone, or other type of sensor.

As mobile device 50 of FIG. 1 is moved by a user as a result of a gesture, sensors 28 will detect these movements, and generate a sensor signal based at least in part on the movement of device 50. The gestures may includes three-dimensional gestures measured by an accelerometer, a gyroscope, or some other sensor. Three-dimensional gestures may include rotating, flicking, jabbing, or otherwise moving the entire device 50.

In one embodiment, gesture recognition system 10 simulates a physical object that is perturbed by a physical motion of mobile device 50, and then an "observer" tracks the state of the simulated physical object to determine a gesture. The determined gesture can be provided as an input to a related software application, and can cause the application to generate a haptic effect to provide feedback to the user in response to the gesture. The physical simulation may be an analogue of the gesture(s) that is to be recognized and may be as simple as a single object with mass in a one-dimensional world, or more complex depending on the application.

Figure 3:
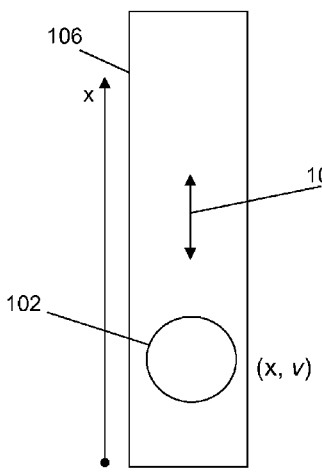
FIG. 3 is a block diagram of an example physical object that is simulated in one embodiment of the present invention.

FIG. 3 is a block diagram of an example physical object that is simulated in one embodiment of the present invention. In this example, gesture recognition system 10 recognizes gestures for determining if a "switch" that is graphically shown on UI 60, such as a wall switch, is up/on or down/off. In the embodiment shown in FIG. 3, the simulated physical object is a ball 102 that is contained in a tube or container 106. Ball 102 is limited to an up and down motion indicated by arrow 104 as if ball 102 is contained on a slide. The ball 102 can be characterized at any time by its position relative to axis x ("x"), and its velocity (v), or (x, v).

Figure 4:
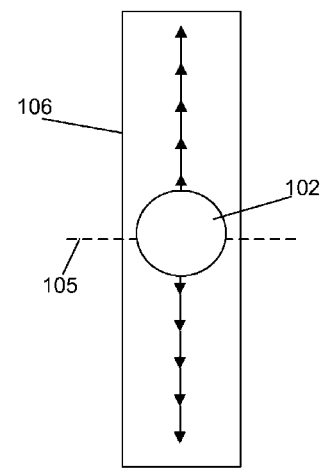
FIG. 4 illustrates the simulated motion of a ball in accordance to one embodiment.

FIG. 4 illustrates the simulated motion of ball 102 in accordance to one embodiment. When no force is applied, ball 102 remains in the center of container 106 indicated by line 105. A constant background force is applied to ball 102, as represented by the spatial derivative of a potential function U(x). In the potential shown in FIG. 4, there is zero net background force in the center of container 106. In the simulated physical system, a perturbation force that is applied in a downward direction causes ball 102 to slide to the bottom of container 106, following the slope of the potential U(x). Likewise, when force is applied in a upward direction, ball 102 slides to the top of container 106. The force applied can be characterized as the derivative d/dx of the potential function U(x), which is the force applied to object 102 at each x, where x is the spatial position of the object. The force may be linear, as in the example of FIG. 4, or may be a periodic manifold (e.g., if x is an angle), any other function U(x) or parameterized family of functions U(x,p) (where p is a parameter). The specification of the background force is instrumental in determining the type of gesture that the algorithm will capture.

Figure 5:
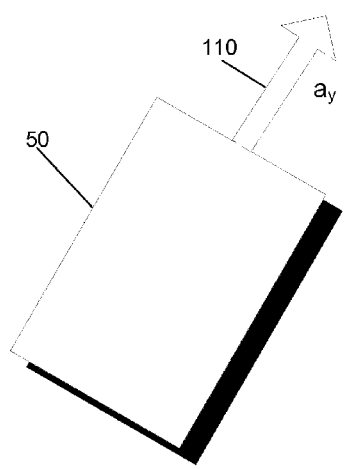
FIG. 5 is a perspective view of the mobile device moving in space via, for example, a hand motion/gesture in accordance with one embodiment.

FIG. 5 is a perspective view of mobile device 50 moving in space via, for example, a hand motion/gesture in accordance with one embodiment. For the example of FIGS. 3 and 4, an accelerometer measures the acceleration along the y-axis (axis 110) because this is the direction that is relevant to using gestures to flick a switch shown in UI 60 on or off. The acceleration is indicated by "$a_y$".

Figure 6:
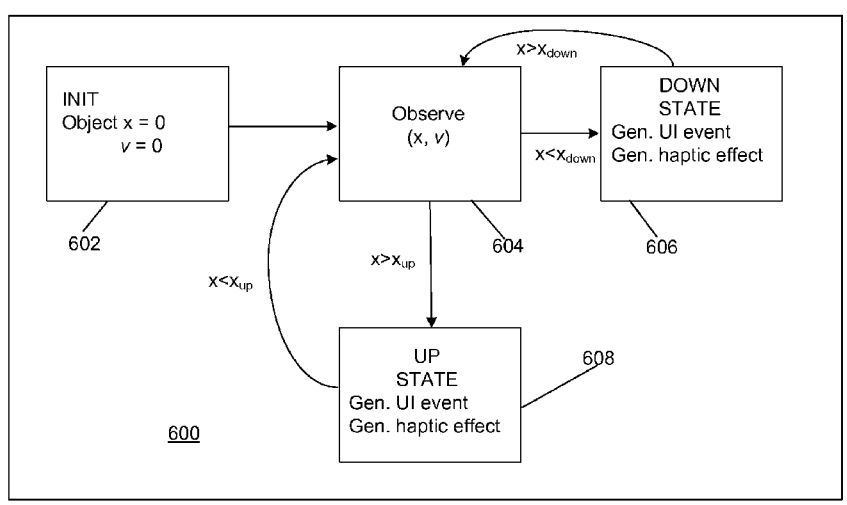
FIG. 6 is a block diagram of a finite state machine or "observer" that observes the simulated object in order to recognize a gesture in accordance with one embodiment.
Figure 7:
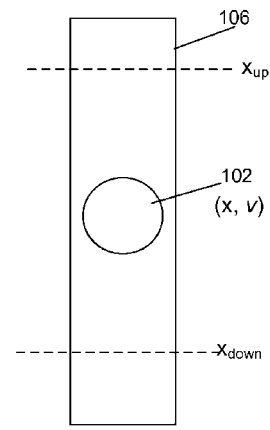
FIG. 7 illustrates the simulated object in a container that includes two threshold values in accordance to one embodiment.

FIG. 6 is a block diagram of a finite state machine 600 or "observer" that observes simulated object 102 in order to recognize a gesture in accordance with one embodiment. In one embodiment, the functionality of finite state machine 600 of FIG. 6, and the flow diagram of FIG. 8 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. FIG. 7 illustrates simulated object 102 in container 106 that includes two threshold x values: $x_{up}$ and $x_{down}$ in accordance to one embodiment. The threshold x values are used by state machine 600 to determine if the simulated switch is up or down.

At 602, object 102 is initialized so that position x=0 and velocity v=0.

At 604, the position x and velocity v of object 102 is observed. In one embodiment, the following pseudo-code implements the observe state of 604:

get sensor data ( )

convert sensors to forces ( )

apply forces to object ( )

time step physics ( )

if (collision), play haptic effect observe physical state( )

The above pseudo-code gets the sensor data from sensor 28 and then maps the sensor data into forces or impulses on the simulated object 102, which are then simulated using a numerical integrator (time step physics) to calculate the position and velocity trajectories of the object. If, based on the force, there is a collision of object 102 on the end of container 106, in one embodiment a haptic effect such as a vibration will be generated that provides an indication of the collision. The following are some example implementations of the functionality of the above pseudo-code:

Convert Sensors to Forces( ):

In one embodiment, the acceleration value $a_y$ is mapped into a velocity impulse by comparing its value against a series of increasing thresholds. Accelerations above a particular threshold but below the next higher threshold will generate an impulse (discontinuous change in velocity) of the simulated object 102.

Apply Forces to Object( ):

In one embodiment, the forces are added in a force sum using Newton's laws of motion:

$$mx = \frac{dU(x)}{dx} + f_{sensor}$$

In addition, there may optionally be a force field, such as gravity, that applies continuous force to the simulated object. This force field may be related to a sensor or it may be designed to provide potential barriers to the object that relate in some way to the UI element that the simulation is tied to.

Time Step Physics( ):

In one embodiment a standard numerical integration method such as forward Euler, Runge-Kutta or Backward Differentiation Formulas ("BDF"s) is used to calculate the position and velocity of the simulated object.

Collisions:

Collisions of the object are calculated by observing its position relative to the extent of the simulation container 106. When the x value of the object is less than 1 radius of the simulated circle from the end of the simulated container, the object is said to have collided with the boundary. This collision generates additional forces or impulses as needed to prevent the object from moving beyond the physical limits of the simulated container. In some embodiments, collisions with the boundary, or with other positions or velocities of interest may trigger haptic feedback giving the user the impression that the mobile device contains a physical object within it.

In addition, haptic feedback may be generated as the object moves, as if to simulate a ball rolling on a wooden slope, steel slope or other material. Geometric features of the simulated slope can be thought of as variations of the potential function U(x) and can result in tactile feedback as the ball moves through the potential.

If at 604, the position of object 102 is less than $x_{down}$, at 606 the Down State is entered and the switch is considered pressed down. A "down" event is sent to processor 22 of FIG. 2, which is provided as input to an application and which causes UI 60 to illustrate the switch moving down. Further, in one embodiment processor 22 causes actuator 26 to generate a haptic effect such as a vibration to indicate that the switch has moved to the down state. Flow then returns to 604.

If at 604, the position of object 102 is greater than $x_{up}$, at 608 the Up State is entered and the switch is considered pressed up. An "up" event is sent to processor 22 of FIG. 2, which is provided as input to an application which causes UI 60 to illustrate the switch moving up. Further, in one embodiment processor 22 causes actuator 26 to generate a haptic effect such as a vibration to indicate that the switch has moved to the up state. Flow then returns to 604.

As shown, more than one type of haptic effect may be generated in the above example. One type of haptic effect provides an indication that the switch has moved from an up state to a down state, or vice versa. The other haptic effect provides an indication of the physical state of object/ball 102 rather than an observed state, such as whether ball 102 has collided with an end of container 106.

In other embodiments, the simulated physical object corresponds or is substantially analogous to the object that is simulated in UI 60. For example, UI 60 and its underlying application may display a flipbook in which a user can change pages by a flipping gesture. In this example, simulated physical object 102 would be a flipbook, and observer 600 would observe the state of the simulated flipbook in response to forces applied to mobile device 50. If the motion results in a flip of a page in the simulated flipbook, then the flipbook displayed on UI 60 will show a page being flipped, and a haptic effect may be generated to indicate the page being flipped.

In another embodiment, UI 60 displays a contact list that can be scrolled up or down through user gestures. Only a portion of the contact list is displayed at one time, and a user can flick mobile device 50 up or down to begin the scrolling of the list. The scrolling will slow down and eventually stop when the user brings mobile device 50 to a stop.

In this embodiment, the simulated physical device may be a ratcheting device in which an object coasts along the ratcheting portion and eventually loses speed and falls into a slot. This simulated physical device may be similar to a roulette wheel with the object being a ball. The observer can view the state of the spinning and the state that the object/ball eventually enters when determining how to slow down the scrolling and at which contact to eventually stop the scrolling. Haptic effects can be generated to reflect the ratcheting. When the end of the contact list is reached, a bounce may be simulated so that the list begins to scroll in the opposite direction.

In other embodiments, the potential function U(x) could be a periodic function such as sin(x) which would correspond to a repetitive gesture requiring the device to be moved up-down with a particular temporal frequency. Further, the system could be two-dimensional and take sensor input from two accelerometer signals (i.e., $a_x$ and $a_y$). Such a system may require a more complex spatial motion in two dimensions to achieve certain states. This could be useful for gestural control of applications with a larger number of primary controls, such as a media player that might respond to shaking, tilting and periodic spatial motion.

In another embodiment, the system could be the Cartesian product of multiple potential functions, with a multi-dimensional sensor to force mapping. As with the above embodiment, this system would enable a variety of complex spatial motions or other sensed gestures and provide control of complex UIs, including games, productivity applications, phone dialers, etc.

Figure 8:
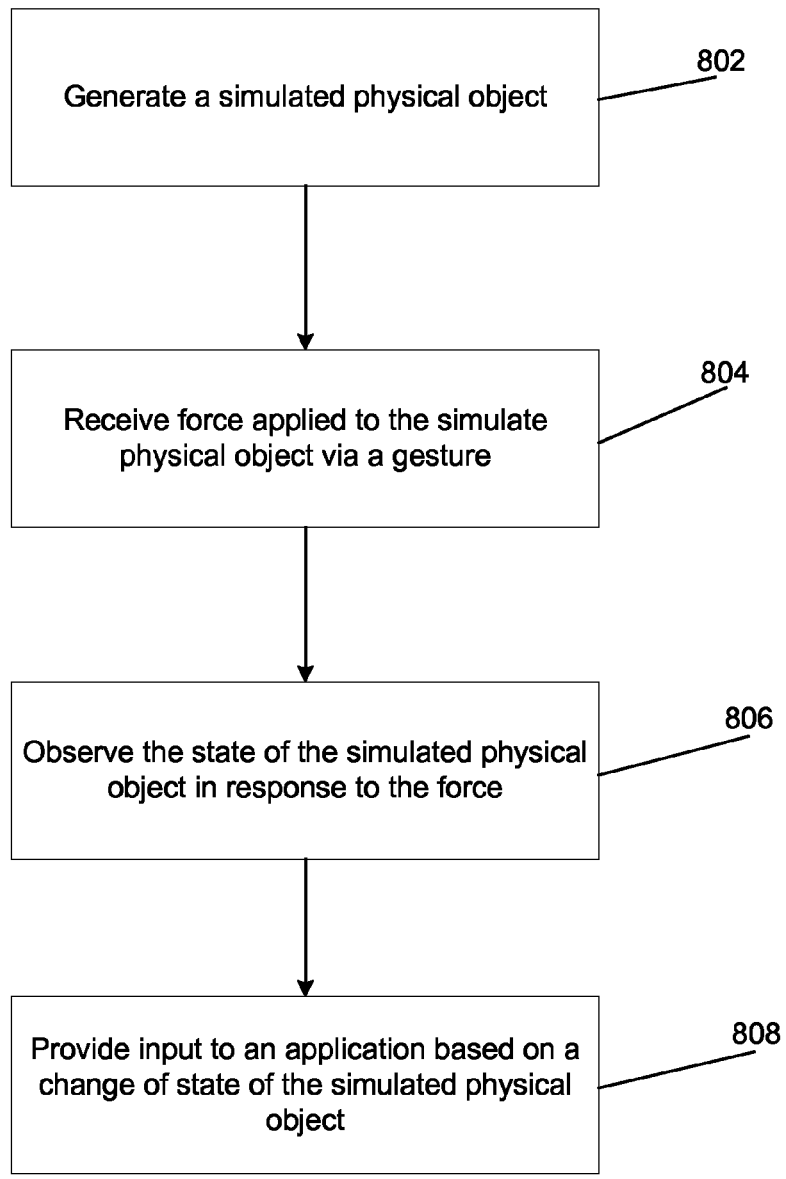
FIG. 8 is a flow diagram of the functionality of a gesture recognition module in accordance with one embodiment when recognizing a gesture in conjunction with an application.

FIG. 8 is a flow diagram of the functionality of gesture recognition module 16 in accordance with one embodiment when recognizing a gesture in conjunction with an application.

At 802, a simulated physical object is generated. In one embodiment, the physical object that is simulated is related to a physical object implemented by the application. For example, if the application is a display of a flipbook on a UI, then the simulated physical object may be a flipbook.

At 804, a force or impulse is applied to the simulated physical object in response to a gesture, such as a hand moving a mobile device. The force or impulse is generated by sensors on the mobile device in the form of sensor data.

At 806, the state of the simulated physical object in response to the force is observed. In one embodiment, the observer is a finite state machine.

At 808, input to an application based on a change of state of the simulated physical object is provided. The application can use this input to provide functionality and in response may generate one or more haptic effects.

As disclosed, one embodiment provides gesture recognition using two main elements: a physical simulation and state machine. The physical simulation may be an analogue of the gesture(s) that is to be recognized and may be as simple as a single object with mass in a one-dimensional world, or more complex depending on the application. The state machine component of the system consists of a finite state machine infrastructure and an observer component. The observer component monitors one or more physical parameters of the physical simulation and uses these to trigger state transitions which may result in changes to a UI element, application state or other gestural response. In addition, the state transitions may generate multimodal haptic-audio feedback that is discrete or a function of one or more of the observed physical parameters. Finally, each state may modify the function U(x), which is the force on the object or introduce other changes into the physical system. For example, the device tilt angle could be used to select between a parameterized family of U(x) functions. The result is a general framework for gesture recognition that does not rely on complex statistical analysis and that is not specifically tailored to an application.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to perform gesture recognition on a mobile device, the gesture recognition comprising:
    generating a simulated physical object;
    receiving sensor data in response to a sensed gesture on the mobile device, the sensor data comprising a force or impulse;
    applying the force or impulse to the simulated physical object;
    observing a state of the simulated physical object in response to the applied force or impulse, wherein the observed state is based on a simulation of a physical reaction to the applied force or impulse on a physical object that corresponds to the simulated physical object; and
    providing input to an application based at least on the observed state of the simulated physical object.

2. The computer readable medium of claim 1, wherein the input to the application comprises an interaction with a user interface.

3. The computer readable medium of claim 2, wherein the user interface displays a graphic that is substantially analogous to the simulated physical object.

4. The computer readable medium of claim 2, wherein the user interface displays a graphic that is modified in response to the interaction, wherein the graphic comprises at least one of a push button, slider, or scrolling list.

5. The computer readable medium of claim 1, wherein the application generates a haptic effect in response to the input.

6. The computer readable medium of claim 5, wherein the haptic effect comprises feedback of the observed state of the simulated physical object.

7. The computer readable medium of claim 5, wherein the haptic effect comprises feedback of a physical state of the simulated physical object.

8. The computer readable medium of claim 5, wherein the haptic effect comprises an actuator generating vibrations on the mobile device.

9. The computer readable medium of claim 1, wherein the simulated physical object is a ball in a container and constrained in a one-dimensional motion.

10. The computer readable medium of claim 1, wherein the force or impulse is sensed by an accelerometer.

11. The computer readable medium of claim 1, wherein the application interprets the observed state as a recognized gesture.

12. A computer implemented method for performing gesture recognition on a mobile device, the method comprising:
    generating a simulated physical object;
    receiving sensor data in response to a sensed gesture on the mobile device, the sensor data comprising a force or impulse;
    applying the force or impulse to the simulated physical object;
    observing a state of the simulated physical object in response to the applied force or impulse, wherein the observed state is based on a simulation of a physical reaction to the applied force or impulse on a physical object that corresponds to the simulated physical object; and
    providing input to an application based at least on the observed state of the simulated physical object.

13. The computer implemented method of claim 12, wherein the input to the application comprises an interaction with a user interface.

14. The computer implemented method of claim 13, wherein the user interface displays a graphic that is substantially analogous to the simulated physical object.

15. The computer implemented method of claim 13, wherein the user interface displays a graphic that is modified in response to the interaction, wherein the graphic comprises at least one of a push button, slider, or scrolling list.

16. The computer implemented method of claim 12, wherein the application generates a haptic effect in response to the input.

17. The computer implemented method of claim 16, wherein the haptic effect comprises feedback of the observed state of the simulated physical object.

18. The computer implemented method of claim 16, wherein the haptic effect comprises feedback of a physical state of the simulated physical object.

19. The computer implemented method of claim 16, wherein the haptic effect comprises an actuator generating vibrations on the mobile device.

20. The computer implemented method of claim 12, wherein the simulated physical object is a ball in a container and constrained in a one-dimensional motion.

21. The computer implemented method of claim 12, wherein the force or impulse is sensed by an accelerometer.

22. The computer implemented method of claim 12, wherein the application interprets the observed state as a recognized gesture.

23. A system comprising:
    a processor;
    a memory coupled to the processor; and
    a sensor coupled to the processor for sensing gestures on the system; and
    wherein the memory stores instructions, that when executed by the processor,
        generate a simulated physical object;
        receive a force from the sensor in response to a gesture on the system;
        apply the force to the simulated physical object;
        observe a state of the simulated physical object in response to the applied force, wherein the observed state is based on a simulation of a physical reaction to the applied force on a physical object that corresponds to the simulated physical object; and
        provide input to an application based at least on the observed state of the simulated physical object.

24. A system of claim 23, further comprising:
    an actuator coupled to the processor;

wherein the application, in response to the input, cause the actuator to generate a haptic effect.

25. The system of claim 23, wherein the simulated physical object is a ball in a container and constrained in a one-dimensional motion.

26. The system of claim 23, wherein the force comprises a linear potential function.

27. The system of claim 23, wherein the force comprises a periodic potential function.

28. The system of claim 23, wherein the force comprises a plurality of potential functions.

* * * * *